United States Patent Office 3,160,530
Patented Dec. 8, 1964

3,160,530
FUEL CELL ELECTRODE CONDITIONING
Romeo R. Witherspoon, Anderson, Ind., assignor to Union Carbide Corporation, a corporation of New York
No Drawing. Filed Sept. 19, 1960, Ser. No. 56,643
9 Claims. (Cl. 136—120)

This invention relates to improved electrolyte- and water-repellent agents for conditioning porous fuel cell electrodes composed of carbon or of metal.

In co-pending patent application No. 764,342, filed September 30, 1958, in the names of K. Kordesch, J. F. Yeager and R. R. Witherspoon, now abandoned, a treatment for rendering the porous carbon electrodes resistant to electrolyte wetting is described wherein the electrodes are treated by immersion in a paraffin-petroleum ether solution. As part of the treatment, kerosene is applied to the inner surfaces of the tubular electrodes.

The above-outlined treatment made possible much longer fuel electrode life than had previously been obtained with low temperature fuel cells employing aqueous electrolytes. However, when the above-mentioned wet-proofing agents are accidentally contacted by oxygen, these fail to protect the electrode from flooding with electrolyte or from drowning by the water produced as a result of the combination of oxygen with hydrogen. It is not possible to protect against this occurrence by thorough impregnation of the electrode with a wet-proofing agent such as kerosene, for the proper gas-electrolyte interface cannot then be established.

The main object of this invention, then is to provide novel electrolyte and water-repellent agents for fuel cell anodes, which will be effective in the presence of oxygen.

The materials by means of which the above object is attained comprise aliphatic monohydroxy alcohols having a chain length ranging between 8 and 18 carbon atoms and polyglycols selected from the group consisting of polypropylene and polybutylene glycols whose molecular weights range between 2000 and 4000. In the group of aliphatic monohydroxy alcohols, those having a chain length of 12 to 18 carbon atoms are preferred.

The alcohols in these groups provide a condition of controlled wetting of the hydrogen electrodes such that the proper gas-liquid interface is set up. Electrodes treated according to this invention will tolerate higher current densities than were previously possible.

These alcohols are applied in the form of a solution using a fairly volatile solvent such as petroleum ether (boiling range, about 90°–150° F.). The preferred range of concentration is approximately 3 to 10 grams of the selected alcohol per 100 cc. of solvent. The minimum amount for best operation at high current densities is believed to be 3 gms./100 cc. Possibly about 5 gms./100 cc. would be considered the maximum for practical applications, since no significant improvements have yet been observed with increasing concentration between 5 and 10 gms./100 cc. Amounts as great as 20 gms./100 cc. have been used with no noticeable ill effects on anode performance.

In accordance with another embodiment of the present invention, it is possible both to protect the hydrogen electrode and also increase fuel cell life, in particular at low current densities by using a mixture of one or more of the above-mentioned long chain alcohols with paraffin. Since paraffin and alcohols have many mutual solvents, there is no problem involved in applying such a mixture to the electrode. 50:50 ratio of paraffin to alcohol is preferred but improved performance is obtained with any combination of the two constituents within the above concentration.

In the same way, the subject alcohols may be used in conjunction with high molecular weight polyethylene having a molecular weight of around 20,000 or with polymeric trifluorochloroethylene, such as "Kel-F."

The anode to be treated with these materials is first constructed so as to have the desired porosity necessary for best operation in a fuel cell and is provided with a suitable hydrogen ionization catalyst such as a finely divided, active "black" of a member of the platinum group metals. The procedure for rendering the electrode water- and electrolyte-repellent consists simply of immersing the electrode in a solution of the selected alcohol in the concentration range described above. After the solution has thoroughly penetrated the pores of the electrode, the electrode is removed from the solution, the excess solution drained off, and the solvent permitted to evaporate, leaving the alcohol throughout the body of the electrode as well as on its surface. It has been calculated that, for a carbon electrode body having a porosity of about 25 percent, the amount of alcohol retained in the finished electrode is about 0.5 to 5 weight percent based on electrode weight when the 3 to 10 gms. of alcohol/100 cc. of solvent range is employed. Obviously, retention of the alcohol and the porosity of the structure are closely related in that a more porous structure would require more alcohol and, conversely, less alcohol would be needed for less porous structures.

If desired, that electrode side adjacent to the gas flow (e.g., the inner surface of a tubular electrode) may be given an additional electrolyte-repellent treatment consisting of a thin coating of a light weight paraffin oil. This coating is not absolutely necessary, but may be used to provide some added benefit under severe operating conditions where only a small amount of alcohol has been used on the electrode. Obviously, the invention is applicable also to flat plate electrodes.

It should be noted that these alcohols are for use only on the hydrogen electrode and only in alkaline electrolyte. They do not function well in acid electrolytes. When applied to the oxygen electrode in alkaline environment, they tend to become oxidized as a result of the peroxide formation step in electrode reactions, subsequently forming acidic products which go into solution rapidly and permit the electrode to wet up and "drown."

In the practice of this invention, a fuel cell was set up consisting of two porous carbon tubular electrodes (½ in. I.D., ¾ in. O.D., approximately 3 in. long and each having approximately 40 to 45 cm.$^2$ surface area) immersed in 15 M KOH electrolyte at room temperature. The hydrogen electrode was provided with a hydrogen ionization catalyst of 0.5 mg./cm.$^2$ Rh (80%)–Pd (20%) in the highly active form and was given an electrolyte-repellent treatment by immersion in a petroleum ether solution of dodecyl alcohol (5 gms. alcohol/100 cc. solvent). The oxygen electrode contained a peroxide decomposition catalyst, 0.5 mg. Ru/cm.$^2$, present in its highly active form. The electrolyte-repellent treatment for this electrode consisted of soaking it in a solution of 3 gms. petrolatum/100 cc. petroleum ether. Gaseous hydrogen and oxygen were supplied to the respective electrodes and a load of 15 to 20 amperes/ft.$^2$ was maintained on the cell. The operating voltage of this cell was about 0.90 volt. After some time, the hydrogen flow was turned off and air permitted to contact the anode while the cell was still on load. As was expected, cell voltage began to drop as soon as the available hydrogen was exhausted. When the hydrogen flow to the electrode was resumed, the cell voltage immediately returned to its original value.

In contrast, similar cells in which the hydrogen electrode has been treated with paraffin as described in U.S. Serial No. 764,342, or with certain alcohols not in the preferred group (e.g., octyl alcohol) would not return to normal operating voltage under the same circumstances. Such cells were effectively "dead" after air contact with the anode occurred under load and could only be revived if an emergency switching mechanism had been provided so as to remove the current load immediately upon interruption of the hydrogen flow. Under such emergency conditions which are quite likely to occur in any practical application of the fuel cell, the preferred alcohols of the subject invention provide an extra safeguard which is desirable even if a safety switching mechanism is used.

In addition, their ability to prolong the useful life of the fuel cell in the absence of the switching mechanism is desirable. All of the preferred monohydroxy alcohols of this invention have been experimentally observed to permit recovery under load.

It has been observed also that lower weight monohydroxy alcohols (8–12 carbon atoms) often permit some degree of recovery in cases of oxygen access which was not possible with paraffin. However, only the preferred 12–18 carbon atoms group permit recovery under load.

The increased cell life under normal high current density operation obtainable with these preferred alcohols, is illustrated in Table I. The fuel cell construction, with regard to electrode size, catalysts, electrolyte and temperature, is identical with that described earlier in this disclosure with the one exception noted below the table. For comparison, heptyl, octyl and decyl alcohols are shown. In particular, the improvement in operating lifetime with cetyl alcohol (16-carbon atom chain) as the electrolyte-repellent should be noted. It is noteworthy to observe the superior performance of the preferred compounds in comparison with that of heptyl, octyl, decyl alcohols and docosanol.

3. An electrode according to claim 2, and additionally characterized by the presence therein of a material selected from the group consisting of paraffin, high molecular weight polyethylene and polymeric trifluorochloroethylene.

4. An electrode according to claim 2, wherein that portion of said electrode which is adjacent to gas flow has a thin coating of a lightweight paraffin oil.

5. A process for rendering porous fuel cell electrodes electrolyte- and water-proof, comprising the step of applying to said electrodes a mixture consisting of about 0.5 to about 5 percent by weight, in the aggregate, of at least one material selected from the group consisting of the aliphatic monohydroxy alcohols having from 8 to 18 carbon atoms, the polypropylene glycols and the polybutylene glycols having a molecular weight ranging from about 2000 to about 4000, said mixture also containing at least one material selected from the group consisting of paraffin, high molecular weight polyethylene and polymeric trifluorochloroethylene.

6. A process for rendering a porous fuel cell electrode electrolyte-repellent and water-repllent comprising applying to said electrode from about 0.5 to about 5 weight percent thereof of an aliphatic monohydroxy alcohol having from 12 to 18 carbon atoms in the chain.

7. A porous fuel cell electrode rendered electrolyte-repellent and water-repellent by the presence in the pores thereof of 0.5% to 5% by weight of an aliphatic monohydroxy alcohol having from 12 to 18 carbon atoms in the chain.

8. A process for rendering a porous fuel cell electrode electrolyte-repellent and water-repellent comprising applying to said electrode from about 0.5 to about 5 weight percent thereof of a polyglycol selected from the group consisting of polypropylene glycol and polybutylene glycol, said polyglycol having a molecular weight of about 3000.

*Table I*

[Fuel cell voltage (volts) at indicated time (current density—15 to 20 amp./ft.$^2$)]

| Electrolyte-Repellent Agent | Initial | 1 week | 2 weeks | 3 weeks | 4 weeks | 5 weeks | 6 weeks | 7 weeks | 8 weeks | 9 weeks |
|---|---|---|---|---|---|---|---|---|---|---|
| n-Heptyl alcohol | 0.83 | 0.80 | | | 0.80 | Dead | | | | |
| n-Octyl alcohol | 0.90 | 0.915 | | 0.835 | 0.83 | 0.77 | Dead | | | |
| n-Decyl alcohol | 0.86 | 0.87 | 0.865 | | Dead | | | | | |
| Lauryl (dodecyl) alcohol | 0.86 | 0.90 | 0.90 | 0.87 | 0.86 | 0.86 | No data | | | |
| Tetradecyl alcohol | 0.87 | 0.885 | 0.87 | 0.86 | 0.86 | 0.87 | 0.85 | | | |
| Cetyl (hexadecyl) alcohol | 0.87 | 0.875 | 0.865 | 0.86 | 0.86 | 0.87 | 0.86 | 0.86 | 0.86 | 0.85 |
| Stearyl (octadecyl) alcohol | 0.86 | 0.89 | 0.86 | 0.86 | 0.82 | Dead | | | | |
| Docosanol | 0.81 | 0.86 | 0.84 | 0.77 | Dead | | | | | |
| Polypropylene glycol,[1] 3000 | 0.795 | 0.82 | 0.84 | 0.83 | 0.76 | 0.74 | 0.73 | | | |

[1] Oxygen electrode catalyst was 1 mg. Pd/cm.$^2$.

What is claimed is:

1. A process for rendering porous fuel cell electrodes electrolyte- and water-proof comprising the step of uniformly applying to said electrodes from about 0.5 to about 5 percent by weight thereof of a material selected from the group consisting of the aliphatic monohydroxy alcohols having between 8 and 18 carbon atoms in the chain, the polypropylene glycols and the polybutylene glycols having a molecular weight ranging from about 2000 to about 4000.

2. A porous fuel cell electrode rendered electrolyte- and water-repellent by the presence on the surface and in the pores thereof of 0.5% to 5% by weight of a material selected from the group consisting of the aliphatic monohydroxy alcohols having from 8 to 18 carbons in the chain, the polypropylene glycols and the polybutylene glycols having a molecular weight ranging from about 2000 to about 4000.

9. A porous fuel cell electrode rendered electrolyte-repellent and water-repellent by the presence in the pores thereof of 0.5% to 5% by weight of polyglycol selected from the group consisting of polypropylene glycol and polybutylene glycol, said polyglycol having a molecular weight of about 3000.

References Cited in the file of this patent

UNITED STATES PATENTS 2,938,064    Kordesch   May 24, 1960

OTHER REFERENCES

Warth: The Chemistry and Technology of Waxes, 2nd edition, published by Reinhold, N.Y., 1956, page 804 relied on.